United States Patent
Bloch

(10) Patent No.: US 9,999,279 B2
(45) Date of Patent: *Jun. 19, 2018

(54) BRACELET WITH INTEGRATED KNIFE

(71) Applicant: Outdoor Edge Cutlery Corporation, Denver, CO (US)

(72) Inventor: David R. Bloch, Morrison, CO (US)

(73) Assignee: Outdoor Edge Cutlery Corporation, Denver, CO (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/605,410

(22) Filed: May 25, 2017

(65) Prior Publication Data
US 2017/0340070 A1 Nov. 30, 2017

Related U.S. Application Data

(60) Provisional application No. 62/341,913, filed on May 26, 2016.

(51) Int. Cl.
*B26B 3/00* (2006.01)
*B26B 11/00* (2006.01)
*A44C 5/00* (2006.01)
*A44C 5/20* (2006.01)
*A44C 15/00* (2006.01)
*A45D 29/04* (2006.01)
*B26B 29/02* (2006.01)
(Continued)

(52) U.S. Cl.
CPC .............. *A44C 5/003* (2013.01); *A41F 9/002* (2013.01); *A44C 5/0007* (2013.01); *A44C 5/0061* (2013.01); *A44C 5/2076* (2013.01); *A44C 15/0015* (2013.01); *A45D 29/04* (2013.01); *B26B 11/00* (2013.01); *B26B 11/008* (2013.01); *B26B 29/025* (2013.01); *B67B 7/00* (2013.01); *G04B 37/0008* (2013.01); *G04B 47/00* (2013.01); *G06K 19/0723* (2013.01)

(58) Field of Classification Search
CPC ......... A44C 5/0007; A44C 5/003; B26B 3/00; B26B 3/06; B26B 29/02; B26B 29/025; B26B 29/00
USPC ........................................... 63/1.12; 224/232
See application file for complete search history.

(56) References Cited

U.S. PATENT DOCUMENTS 2,391,574 A 12/1945 Glenn
2,527,710 A 10/1950 Davidson, Jr.
(Continued)

FOREIGN PATENT DOCUMENTS

GB 329566 A * 5/1930 ............... B26B 3/06

OTHER PUBLICATIONS

Partial European Search Report, Nov. 2, 2017, 11 pages.
(Continued)

*Primary Examiner* — Jack W Lavinder
(74) *Attorney, Agent, or Firm* — Lewis Brisbois Bisgaard & Smith LLP; Craig Mueller

(57) ABSTRACT

A bracelet or flexible band comprised of a flexible member that on one end is interconnected to a knife and on another end, is connected to a sheath that selectively receives the knife in the locking fashion. When needed, the knife is rotated within the sheath to facilitate release thereof from a lock that is integral with the sheath. Once removed from the sheath, the knife can be used for self-defense, cutting rope or cord in an emergency situation, or for general utility cutting tasks.

15 Claims, 8 Drawing Sheets

(51) Int. Cl.
   *B67B 7/00* (2006.01)
   *G04B 37/00* (2006.01)
   *G04B 47/00* (2006.01)
   *G06K 19/07* (2006.01)
   *A41F 9/00* (2006.01)

(56) References Cited

U.S. PATENT DOCUMENTS

| | | | |
|---|---|---|---|
| 2,618,057 A | 11/1952 | Gibson | |
| 2,783,536 A | 3/1957 | Boast | |
| 2,901,823 A | 9/1959 | Widen | |
| 3,246,713 A * | 4/1966 | Nichols | B62B 3/0612 180/13 |
| 3,524,570 A | 8/1970 | Seguine | |
| 3,823,421 A | 7/1974 | Collins | |
| 3,823,522 A | 7/1974 | Forgett | |
| 3,958,330 A * | 5/1976 | Hutchens | B26B 29/025 224/232 |
| 4,150,464 A | 4/1979 | Tracy | |
| 4,404,747 A | 9/1983 | Collins | |
| D300,112 S | 3/1989 | Osterhout | |
| 4,835,863 A | 6/1989 | Salandre | |
| 4,854,044 A | 8/1989 | Collins | |
| 4,964,554 A * | 10/1990 | Collins | B26B 3/06 224/232 |
| 5,002,213 A * | 3/1991 | Newton | A45F 5/14 224/232 |
| D321,548 S | 11/1991 | Collins | |
| 5,067,239 A | 11/1991 | Collins | |
| 5,092,046 A | 3/1992 | Collins | |
| 5,123,167 A | 6/1992 | Kelley | |
| 5,146,684 A | 9/1992 | Hagler | |
| 5,222,279 A | 6/1993 | Frano et al. | |
| 5,379,520 A | 1/1995 | Collins | |
| 5,507,076 A | 4/1996 | Anscher | |
| 5,511,311 A | 4/1996 | Collins | |
| 5,647,130 A * | 7/1997 | Collins | B26B 29/025 224/232 |
| 5,794,347 A | 8/1998 | Serpa | |
| 5,915,793 A * | 6/1999 | Serpa | B26B 29/025 224/232 |
| 6,293,448 B1 | 9/2001 | Pietrusynski | |
| 6,442,843 B1 | 9/2002 | Jue | |
| D465,542 S | 11/2002 | Bloch | |
| 7,080,456 B2 | 7/2006 | Wu | |
| 7,434,316 B2 | 10/2008 | Nenadic | |
| 7,469,475 B2 | 12/2008 | Wong | |
| 7,597,223 B1 | 10/2009 | Martinez | |
| 8,322,586 B2 * | 12/2012 | Davis | A45F 5/02 224/197 |
| D723,132 S | 2/2015 | Borland | |
| 9,044,870 B2 | 6/2015 | Yeh | |
| 9,095,202 B1 | 8/2015 | Vanheteren | |
| 9,254,577 B2 | 2/2016 | Crawford | |
| D770,327 S | 11/2016 | Chan | |
| D772,006 S | 11/2016 | Squiers et al. | |
| 2005/0204565 A1 | 9/2005 | Wong | |
| 2006/0021229 A1 | 2/2006 | Wu | |
| 2007/0266569 A1 | 11/2007 | Nenadic | |
| 2008/0250652 A1 | 10/2008 | Fellhoelter | |
| 2010/0270343 A1 | 10/2010 | Clark | |
| 2011/0139645 A1 | 6/2011 | Ranieri | |
| 2012/0102759 A1 | 5/2012 | Huang | |
| 2013/0031935 A1 | 2/2013 | Kelleghan | |
| 2014/0109615 A1 | 4/2014 | Millan | |
| 2014/0137414 A1 | 5/2014 | Murphy et al. | |
| 2014/0338197 A1 | 11/2014 | Frazer | |
| 2015/0190938 A1 | 7/2015 | Kommer | |
| 2015/0208795 A1 | 7/2015 | Vanheteren | |

OTHER PUBLICATIONS

"5 in 1 Outdoor Survival Gear Escape Paracord Bracelet Flint/Whistle/Compass/Scraper," believed to be on sale at least by Aug. 17, 2016, retrieved from https://www.boardwalkbuy.com/products/5-in-1-outdoor-survival-gear-escape-paracord-bracelet-flint-whistle-compass-scraper?utm_medium=cpc&utm_source=googlepla&gclid=CjwKEAjwltC9BRDRvMfD2N66nIISJARCq8591rKgFVKcoy8Fg9KD9-v2gMf9_vb1Aw8oOEvLi6Bt1uRoClwPw_wcB, 4 pages.

"Hidetoshi Nakayama Knife Archives," believed to be on sale at least by Aug. 17, 2016, retrieved from http://www.artknives.com/hidetoshi-nakayama-archives.html, 6 pages.

Non-Final Office Action dated Oct. 6, 2017 for U.S. Appl. No. 15/695,390.

\* cited by examiner

BRACELET WITH INTEGRATED KNIFE

This application claims the benefit of U.S. Provisional Patent Application Ser. No. 62/341,913, filed May 26, 2016, the entirety of which is incorporated by reference herein.

FIELD OF THE INVENTION

Embodiments of the present invention generally relate to a bracelet comprising a first end and a second end interconnected by a knife selectively enclosed within a sheath to form a closed loop.

BACKGROUND OF THE INVENTION

It is often advantageous to carry a knife to perform everyday tasks, to cut a seatbelt or a tangled line in an emergency, or for self-defense. One problem with most knives is that they must be stored in pockets, handbags, or in a sheath worn on a belt, which can be cumbersome and unsightly. It can also be time consuming to draw a knife from a pocket, handbag, or sheath, especially in a stressful or emergency situation. One example of an emergency is a car accident, wherein the seatbelt will not release and a cutting implement is needed to cut the seatbelt to allow vehicle extrication. It is easy to envision in this situation, it may be difficult or impossible for one to access a pocket or handbag to retrieve a knife to cut the seatbelt and free themselves. Further, in a self-defense situation, the extra time it takes to retrieve a knife from a pocket or handbag could result in serious injury or death. If a person is in a struggle, accessing a knife from a pocket or handbag may be difficult or impossible.

It is, thus, a long-felt need to provide an accessible knife that can be quickly and easily deployed that need not fit into a pocket, on a belt, or in a handbag. The knives contemplated by embodiments of the present invention may be worn about one's wrist, ankle, or waist and, thus, can be quickly and easily deployed any time if needed in an emergency, for self-defense, or when the need arises to cut a rope or cord, open a box, or open a letter, etc.

SUMMARY OF THE INVENTION

It is one aspect of some embodiments of the present invention to provide a knife comprising the blade extending from a blade base that supports the blade and functions as a small handle portion. The blade base and handle may be an integral unit, i.e., a skeleton knife. The blade base is also operatively interconnected to one end of a flexible band or strap. The other end of the knife is selectively interconnected to a sheath that selectively receives the blade. The opposite end of the sheath may be either permanently fixed or selectively interconnected to an opposite end of the flexible band by way of a clasp and hasp, a loop and T-post connection, a hook and eye, or with a magnetic/ferromagnetic interaction. How the sheath interconnects to the flexible band increases safety as the blade is enclosed in the sheath before the flexible band is wrapped around the wrist. Without this connection scheme, the knife must be inserted into the sheath to attach to the bracelet to one's wrist, which could cause serious injury as the sharp knife blade must be placed near the user's wrist to affect bracelet closure.

As mentioned above, the knife blade extends from a base, which in one embodiment includes a protective handle guard extending therefrom. A top surface of the blade and/or blade base may include a curved or ramped thumb grip with serrations to provide a substantially non-slip gripping surface (also known in the art as "jimping"). Because at least a portion of the flexible band functions as a portion of the knife handle, upward force on the blade's cutting edge can cause the band to flex and the blade to rotate backward, which can cause ineffective cutting force. Gripping areas on the blade and/or the blade base acts as a purchase area that receives the user's thumb or forefinger to prevent upward rotation of the blade; and allows the short blade base and flexible band to effectively function as a rigid knife handle.

The knife, sheath, and band form a bracelet, which may be circular, when the knife is inserted into the sheath. When the knife is positioned within the sheath, it is locked such that the knife or sheath must be moved in a specific fashion to release the knife. That is, the sheath of some embodiments of the present invention includes a positive locking mechanism that secures the knife within the sheath. The positive locking mechanism improves safety and prevents loss because the knife is secured and accidental or unintended release is eliminated. Release of the positive locking mechanism of some embodiments requires opposing forces acting on the sheath and the blade base and/or flexible band. One force is transferred from the thumb or forefinger to press down on the top of the sheath. The second force is generated by the thumb or forefinger in an opposing direction to the first force, which urges the blade base along an outer surface associated with the sheath opening (which may be arcuate) and eventually allows for removal of the knife. As knife removal requires opposing forces be applied in a specific fashion to both the top of the sheath and the blade base or flexible band, unintended or accidental release of the knife is drastically reduced or eliminated; even in a hand-to-hand struggle when an attacker applies pulling or twisting forces directly to the bracelet or to the wearer's wrist in close proximity to the bracelet.

The positive lock of one embodiment of the present invention comprises a detent that captures the handle guard extending from the blade base. The handle guard increases safety and helps avoid injury by preventing the user's fingers from sliding past the blade base and onto the blade edge. The handle guard has a portion that engages the deflectable detent that is selectively interconnected to the sheath by way of a flexible arm. When relaxed, the detent is near the sheath, which traps the handle guard between the open end of the sheath and a stop on the detent. The deflectable arm is urged away from the sheath when the blade base is rotated within a plane corresponding to the outer surface of the sheath. Such movement will urge the handle guard against the detent, thereby deflecting the arm and biasing the detent away from the sheath which allows the knife to be removed. The detent may include a socket that forms a seat that snugly receives a bulged portion of the handle guard when the knife is within the sheath. This feature helps ensure the knife stays within the sheath when the lock is in place, i.e., when the detent is released.

As mentioned above, the knife is released from the sheath by movement of the knife within the sheath in a specific fashion. The sheath has an internal volume with a ceiling and a floor. A gap is provided between the knife's cutting edge and the floor of the sheath when the knife is within the sheath. The gap allows the knife to be rotated within the sheath and the blade base relative to the sheath, which urges the handle guard against the detent to deflect the arm and facilitate movement of the bulge from the socket. To facilitate rotation of the blade within the sheath, the blade may be shaped to provide a pivot point that selectively engages the sheath ceiling. A bottom surface of the sheath may be non-continuous or the arm may have a groove that receives the blade tip to facilitate blade rotation and release.

It is still yet another aspect of some embodiments of the present invention to provide a flexible wristband made of flexible, resilient material. In one embodiment, the wristband is formed of braided paracord. Other embodiments of the present invention employ a metal bracelet, commonly found on many watches; or a rubber band, found on many dive watches. One of ordinary skill in the art will appreciate the flexible band need not be associated with a user's wrist. More specifically, in one embodiment of the present invention the flexible portion interconnected to the knife and sheath is a belt, wherein the knife and sheath form a belt buckle or a secondary belt clasp. In operation, a user simply moves a knife relative to the sheath to release the knife and open the belt. The end of the flexible band is interconnected to a T-post or hook extending from the sheath. One of ordinary skill in the art will appreciate there are other ways to interconnect the ends of the flexible band to the knife and sheath without departing from the scope of the invention.

The wristband may be made of any material such as paracord, a stretch elastic material, stainless steel, Kevlar, rubber metal, or carbon fiber. The wristband can be made of a bi-stable spring that selectively stiffens, i.e., the material of a slap bracelet. In one embodiment of the present invention, the blade of one embodiment is made of stainless steel (e.g., 8Cr13MoV). And, in one embodiment of the present invention, the blade is a 1.5-inch hawk-bill blade, but any blade may be used such as a drop point blade. The sheath and blade base may be made of glass/nylon polymer or any other suitable plastic.

As one of ordinary skill in the art will appreciate, the component fit within the sheath need not be a knife. For example, some embodiments of the present invention employ a can opener, a flashlight, a flint, an RFID device, a key, a USB device, a fingernail file, a multi-tool, a compass, a pen, a computer memory device, a whistle, an energy storage device, or oil, wax, liquid, or other common material that can be vaporized or atomized (e.g., smoking oil). In this later example, the bracelet could function as a smoking device, wherein the sheath or component that fits into the sheath accommodates a heating device. The opposite end of the bracelet would comprise a device that selectively fits within a user's mouth, wherein he or she would draw vaporized smoking products similar to a ("vape pen"). The smoking product could be stored in oil form in at least one end of the bracelet or in a flexible tube incorporated into the flexible portion of the bracelet. In one embodiment of the present invention, the item associated with the blade base are selectively interchangeable. For example, the knife can be removed such that the blade base can receive USB storage device. Removeability of the knife also allows it to be replaced when it becomes dull.

Further, the sheath (or component received therein) may include additional functionality/features, such as a compass, a watch, an RFID device, or other wireless data transferring devices that allow individuals to unlock doors, pay for merchandise, transmit their identity or vital statistics. In some other embodiments, the sheath includes components that allow it to communicate with a cellular phone or other device via wireless communication means such as Wi-Fi or Bluetooth. That is, the sheath may include a screen and electronic components and function somewhat like an Apple Watch. The flexible portion of the bracelet may also accommodate a wristwatch, wherein the clasp can be separated to reveal the knife. Those of ordinary skill in the art will appreciate that some embodiments may function as a heart rate monitor or fitness tracker.

It is, thus, one aspect of some embodiments of the present invention to provide a bracelet with in integrated knife, comprising: a sheath having a first end and a second open end; a knife comprised of a blade extending from a blade base, the blade base having a first end for interconnection to the blade and a second end, the blade base also having a handle guard extending therefrom; a flexible band having a first end operatively interconnected to the first end of the sheath, and a second end operatively interconnected to the second end of the blade base; wherein the sheath includes a selectively deflectable arm that ends in a detent positioned adjacent the second open end of the sheath; and wherein the detent has a first position of use where the handle guard is positioned between the second open end of the sheath and the detent, and a second position of use where the detent is deflected such that the handle guard is free to move away from the second open end of the sheath.

It is another aspect of some embodiments to provide a bracelet with an integrated device, comprising: a sheath having a first end and a second open end; a device comprised of a first end configured to selectively fit within the sheath, and a second end with a protrusion extending therefrom; a flexible band having a first end operatively interconnected to the first end of the sheath, and a second end operatively interconnected to the second end of the second end of the device; wherein the sheath includes a selectively deflectable arm that ends in a retaining member positioned adjacent the second open end of the sheath; and wherein the retaining member has a first position of use where the protrusion is positioned between the second open end of the sheath and the retaining member, and a second position of use where the retaining member is deflected such that the device is free to move from of the sheath.

It is still yet another aspect of some embodiments of the present invention to provide a sheath, comprising: a first surface; a second surface spaced from the first surface; a third surface interconnecting the first surface and the second surface; a fourth surface interconnecting the first surface and the second surface; wherein the first surface, the second surface, the third surface, and the fourth surface define an internal volume; an arm deflectably attached to the fourth surface; and a detent interconnected to an end of the arm, the detent adapted to selectively engage a portion of a device that is adapted to fit within the volume to lock the device within the sheath.

The Summary of the Invention is neither intended nor should it be construed as being representative of the full extent and scope of the present invention. That is, these and other aspects and advantages will be apparent from the disclosure of the invention(s) described herein. Further, the above-described embodiments, aspects, objectives, and configurations are neither complete nor exhaustive. As will be appreciated, other embodiments of the invention are possible using, alone or in combination, one or more of the features set forth above or described below. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

Figure 1:
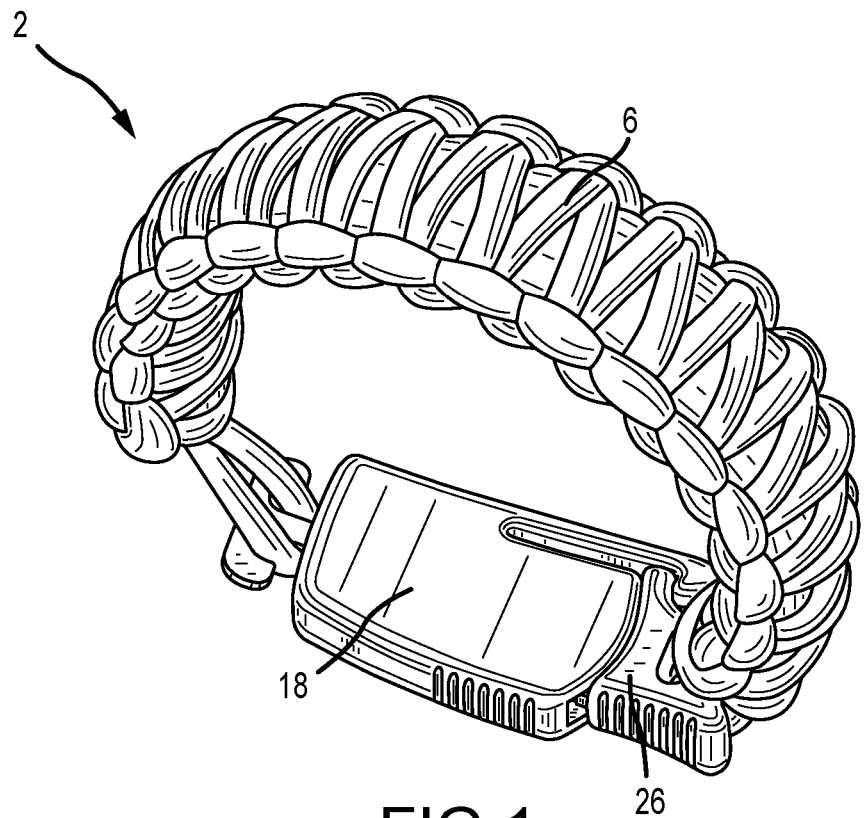
FIG. 1 is a perspective view of a bracelet of one embodiment of the present invention.

To assist in the understanding of one embodiment of the present invention the following list of components and associated numbering found in the drawings is provided herein:

| No. | Component. |
|-----|------------|
| 2 | Bracelet |
| 6 | Flexible band |
| 10 | Flexible band first end |
| 14 | Flexible band second end |
| 18 | Sheath |

-continued

| No. | Component. |
|-----|------------|
| 22 | Knife |
| 26 | Blade base |
| 28 | Handle |
| 30 | Handle guard |
| 34 | Detent |
| 36 | Socket |
| 38 | Outer surface |
| 42 | Sheath first end |
| 46 | Hook |
| 50 | Sheath second, open end |
| 54 | Blade |
| 58 | Upper edge |
| 62 | Ceiling |
| 66 | Floor |
| 70 | Tip |
| 74 | Arm |
| 82 | Apex |
| 86 | Loop |
| 90 | Handle guard end |
| 94 | Bulge |
| 98 | Nose |
| 102 | Upper surface |
| 106 | Lower surface |
| 110 | Watch |

The drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

FIGS. 1-7 show a bracelet 2 of one embodiment of the present invention. The bracelet 2 is comprising a flexible band 6 having a first end 10 and a second end 14. The first end 10 of the flexible band 6 is interconnected to a sheath 18 and the second end 14 is interconnected to a knife 22. The flexible band 6 of one embodiment of the present invention is formed of braided paracord. However, those of ordinary skill in the art will appreciate that other flexible bands, straps, bow strap, or harness may be employed without departing from the scope of the invention.

Figure 2:
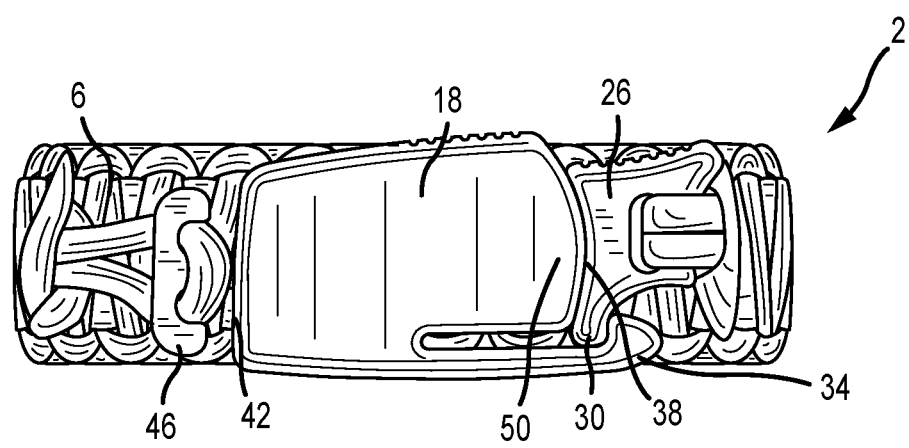
FIG. 2 is a bottom plan view of the bracelet.
Figure 3:
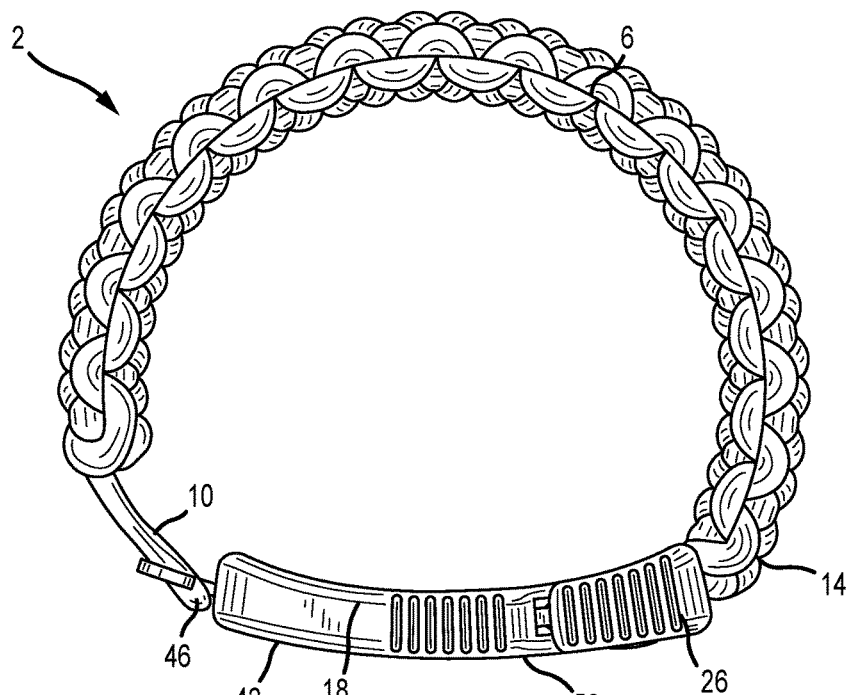
FIG. 3 is a front elevation view of the bracelet.

The knife 22 when positioned within the sheath as shown in FIGS. 1-3, forms an article adapted to fit around a user's wrist, ankle, or waist; or be incorporated into any strap, such as a bow strap. A bracelet 2 is provided in the figures provided herein. The clasp of the bracelet comprises the sheath 18 that selectively receives the knife 22. The knife 22 can cut items for everyday utility, in an emergency, or be used for self-defense.

Figure 3A:
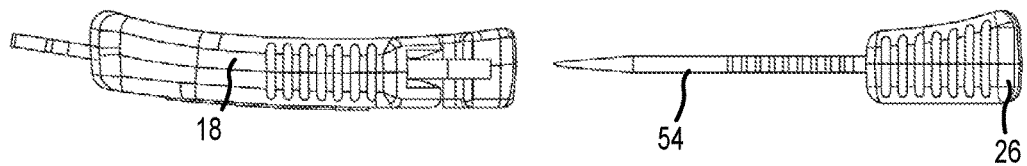
FIG. 3A is front elevation view showing a knife removed from a sheath.

As shown in FIGS. 1-4, the knife 22 includes a blade 54 interconnected to a blade base 26. The blade base 26 and a portion of the flexible band 6 define a handle 28 interconnected to the blade. The blade base 26 includes a handle guard 30 selectively locked by a movable detent 34 associated with the sheath. A socket 36 of the detent 34 and an outer surface 38 of the sheath trap the handle guard to lock the blade within the sheath. The sheath 18 has a first end 42 which may have a hook 46, or another device, for selective receipt of the first end of the flexible band 6. A second end 14 of the flexible band is tied or otherwise interconnected to the blade base 26. The sheath 18 may have a curved inner surface, i.e., the surface configured to contact the user's body, and the blade base 26 may have a complementary arcuate surface (see also, FIG. 3A). The curved surface or surfaces enhance user comfort and ergonomics. Further, these surfaces may incorporate a cushion to increase comfort.

Figure 4:
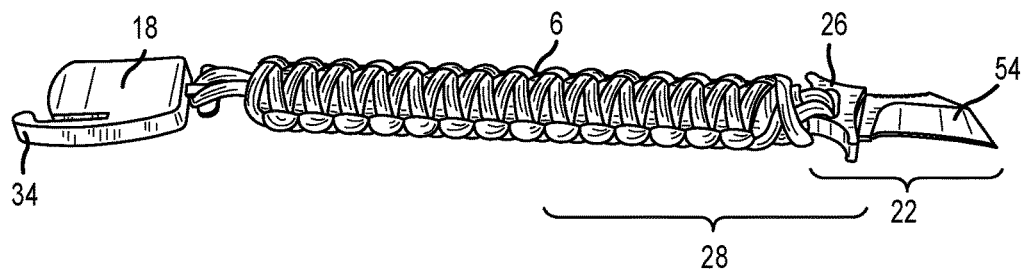
FIG. 4 is a perspective view of the bracelet in a second, open position of use wherein a blade has been removed from the sheath.
Figure 5:
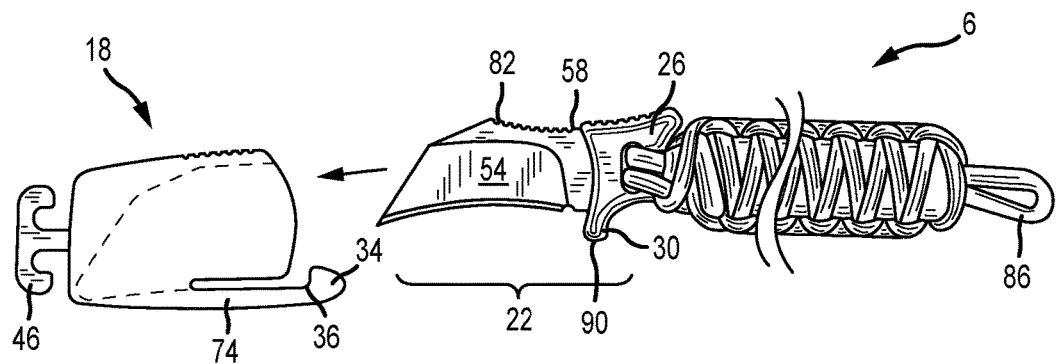
FIG. 5 is a partial cross-sectional front elevation view showing the knife removed from the sheath.

FIGS. 4 and 5 show the bracelet 2 in an open configuration. Here, the knife 22, which comprises a blade 54 and the blade base 26, has been removed from the sheath 18, thereby allowing the flexible band to elongate. The handle guard 30 protects the user's fingers from sliding past the blade base and unintended contact with the blade 54 and cutting edge. The blade base 26 and the blade 54 may also include a knurled upper edge 58 that enhances gripping and serves as a surface for user's thumb or forefinger to press downward on the blade 54 to prevents upward rotation of the blade that may result from band flex.

Figure 6:
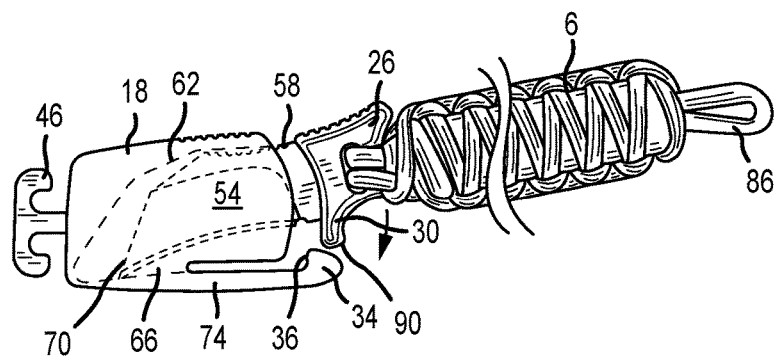
FIG. 6 is a partial cross-sectional front elevation view showing the interaction between the knife and sheath as the knife is initially positioned within the sheath with the handle guard clear of a locking detent.
Figure 7:
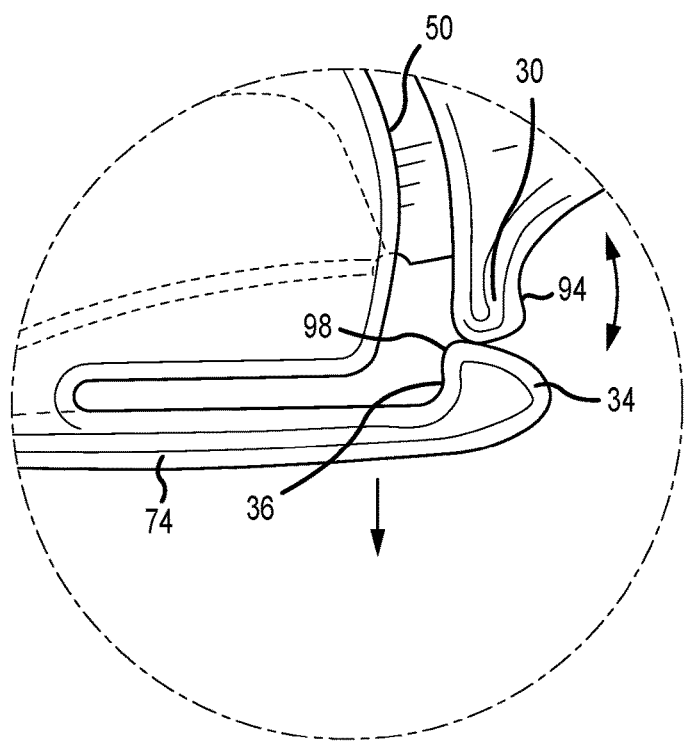
FIG. 7 is a detailed view showing the interaction between the handle guard and the positive locking detent.
Figure 8:
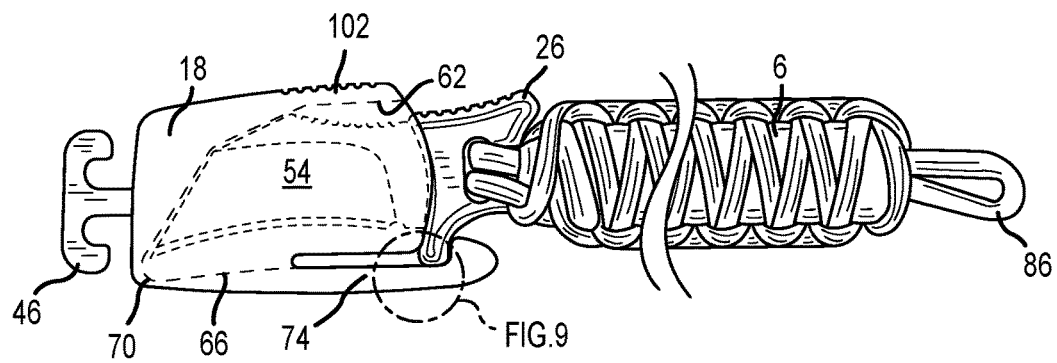
FIG. 8 is a front elevation view showing the blade positioned within the sheath and in the locked position.
Figure 9:
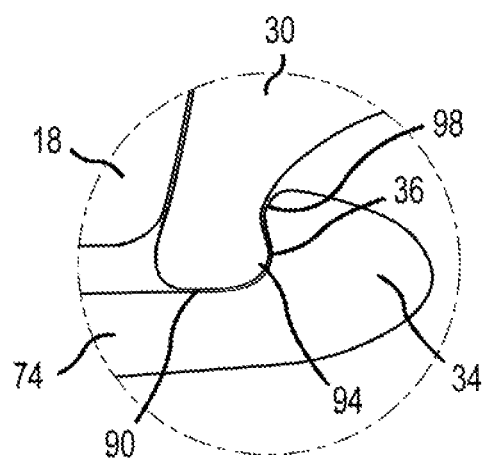
FIG. 9 is a detailed view of FIG. 8.
Figure 10:
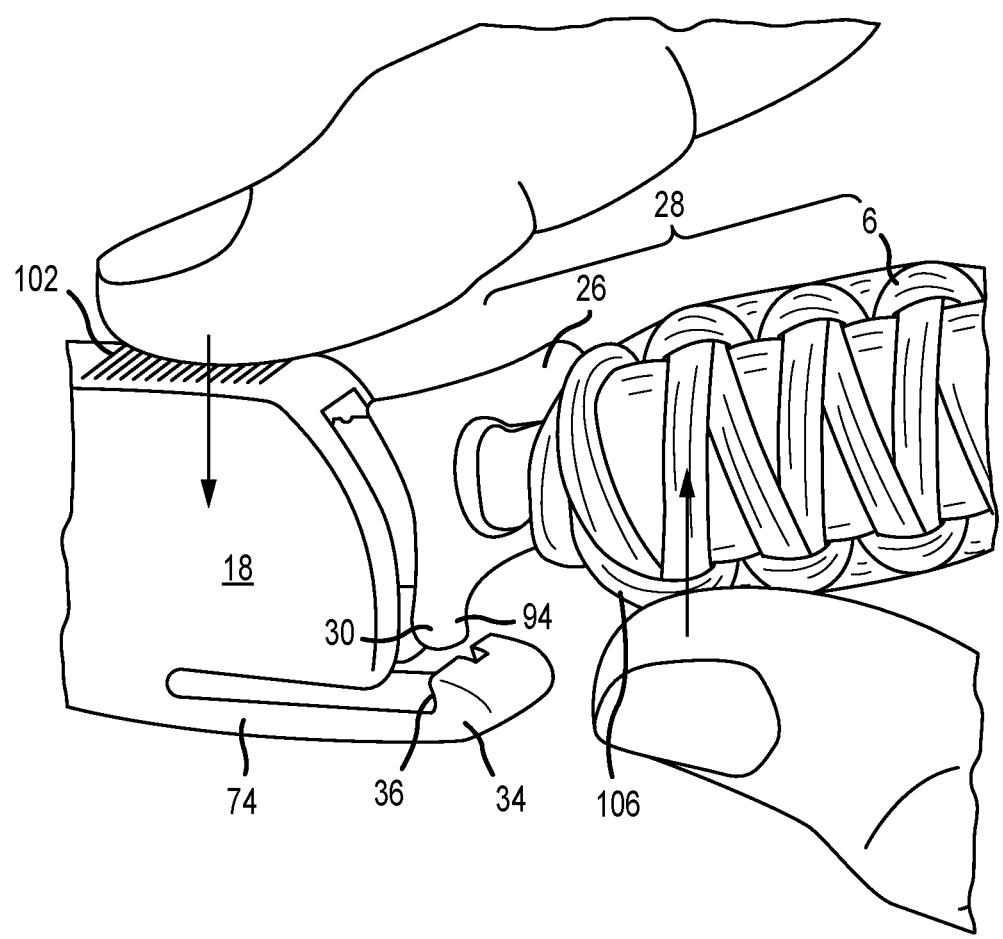
FIG. 10 is a perspective view illustrating how knife release is initiated.
Figure 11:
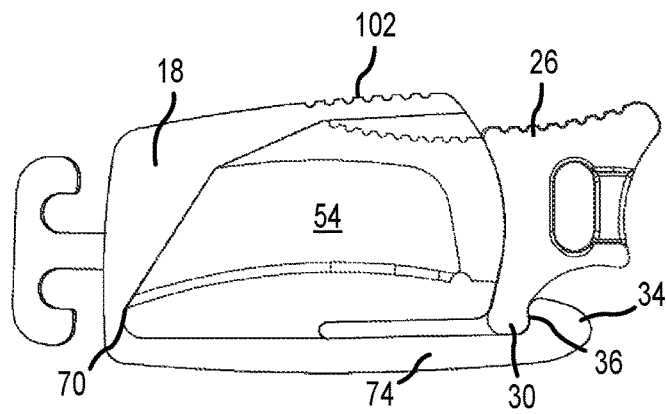
FIG. 11 is a front elevation view showing the knife seated in the sheath and positively locked, a portion of the sheath is shown transparent.
Figure 12:
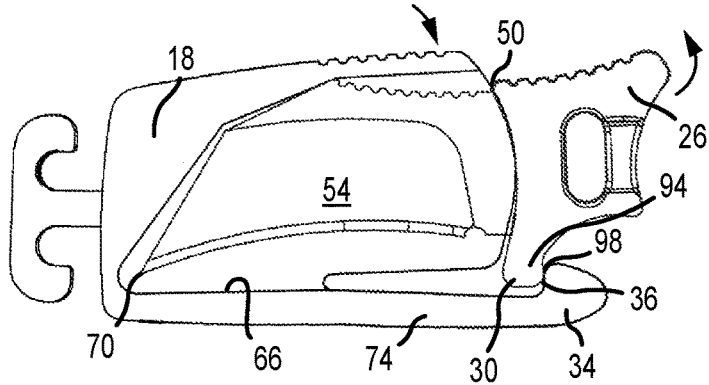
FIG. 12 is a front elevation view showing the knife at an initial phase of removal from the sheath, wherein an arm is fully deflected, a portion of the sheath is shown transparent.
Figure 13:
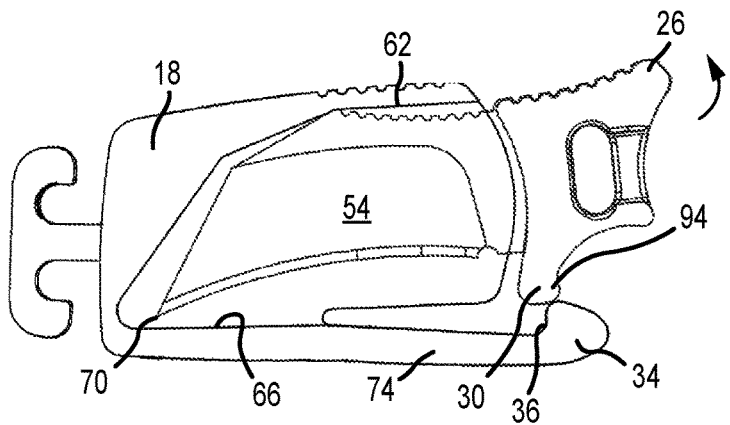
FIG. 13 is a front elevation view showing the knife at an intermediate phase of removal from the sheath, wherein the arm is deflected and the bulge on the handle guard has cleared the nose on the detent, a portion of the sheath is shown transparent.

FIGS. 6-9 illustrate how the knife is locked within the sheath. The sheath 18 includes a ceiling 62 and a floor 66, wherein a blade tip 70 is spaced from the floor 66 when the knife is fully inserted within the sheath 18. As the blade 54 is initially inserted within the sheath, as shown in FIG. 6, the handle guard 30 is spaced from the detent 34. Further insertion of the blade 54 into the sheath 18 will cause the end 90 of the handle guard to come into close proximity or engage the detent as shown in FIG. 7. Still further blade insertion will engage a bulge 94 of the handle guard 30 onto a nose of the detent 98, thereby flexing the arm 74 and moving the detent 34. The final locking step is performed by rotating the knife base 26 downwardly along the second, open end of the sheath 50, which positions the handle guard 30 between the second end of the sheath 50 and the detent 34, wherein the bulge 94 is firmly seated in a socket 36 provided by the detent. FIGS. 8 and 9 show the final locking configuration, wherein arm 74 has relaxed and the detent 34 is positioned such that the bulge 94 is firmly seated in the socket 36.

Figure 14:
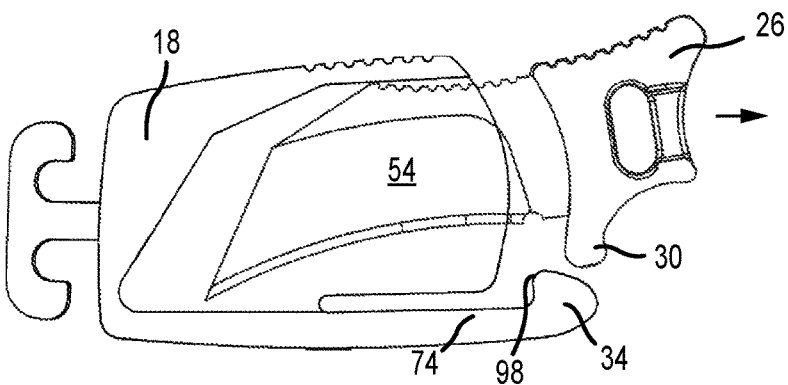
FIG. 14 is front elevation view showing the knife at a final stage of removal from the sheath, wherein the arm is in a relaxed, un-deflected position, a portion of the sheath is shown transparent.

FIGS. 10-14 show how the blade 54 is released from the sheath 18. More specifically, to remove the knife 22 from the sheath 18, the user presses on the upper surface 102 of the sheath and provides an opposing force to a lower surface 106 of the blade base 26 and an adjacent portion of the flexible band 6. These opposing forces (see opposing arrows on FIG. 12) cause the blade 54 to rotate within the sheath 18 and moves the tip 70 closer to the floor 66 of the sheath 18. This rotation also moves the handle guard 30 along the second, open end of the sheath 50 and, thus, moves the handle guard 30 out of the socket 36 provided by the detent 34. During this phase, the bulge 94 will engage the nose 98 which flexes the arm 74 and allows further movement of the handle guard 30 and blade base 26 from the sheath 18. That is, movement of the blade base 26 relative to the sheath 18 as shown will eventually allow the handle guard 30 to escape the detent 34, wherein the handle guard 30 is spaced from the detent 34 as shown in FIG. 14. The blade 54 may be hawk-bill, drop point, or other shape to provide an apex 82 at the upper edge thereof that selectively engages a point on the ceiling 62 to facilitate rotation of the knife within the sheath. In one embodiment, this blade release sequence generates an audible noise, such as a "pop."

Figure 15:
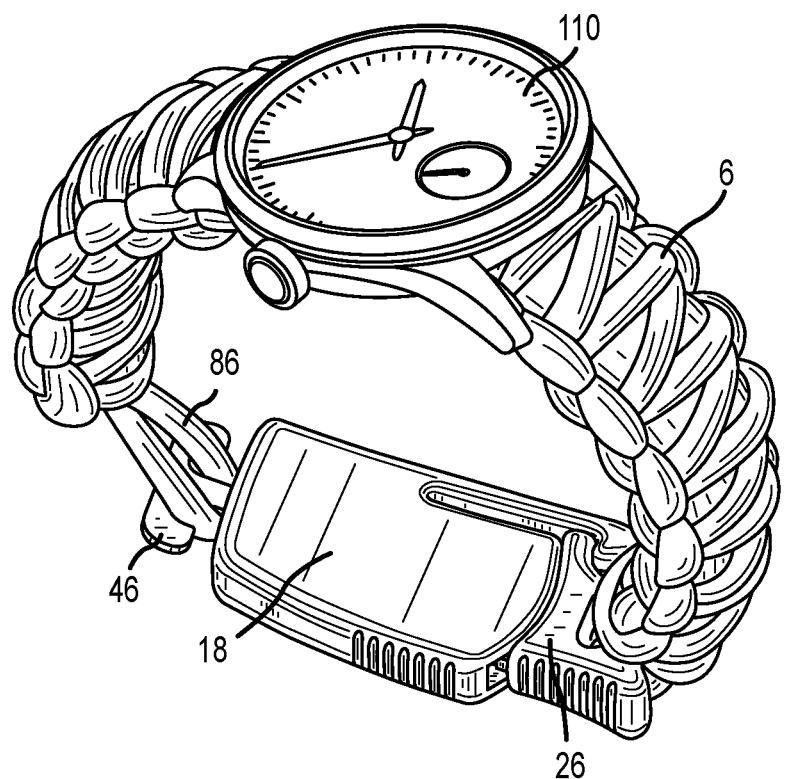
FIG. 15 is a perspective view of a bracelet of another embodiment of the present invention that incorporates a watch.
Figure 16:
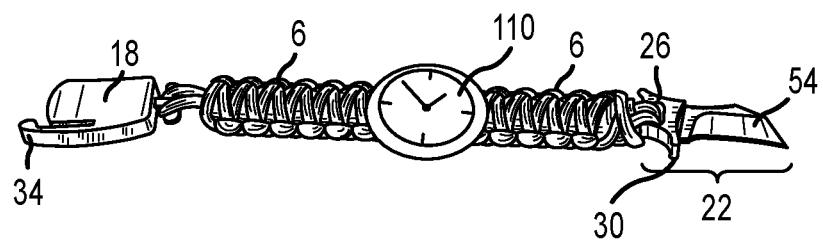
FIG. 16 is a top perspective view of the combination watch and bracelet shown in FIG. 15.

FIGS. 15 and 16 show another embodiment of the present invention, wherein a watch 110 incorporated in the flexible band 6. Here the clasp is the knife/sheath combination.

In the examples shown, a paracord flexible band is provided. The paracord terminates in a loop 86 selectively interconnected to the hook 46 on the sheath. The other end of the flexible band is tied or otherwise interconnected to the blade base 26.

While various embodiments of the present invention have been described in detail, it is apparent that modifications and alterations of those embodiments will occur to those skilled in the art. It is to be expressly understood that such modifications and alterations are within the scope and spirit of the present invention, as set forth in the following claims. Further, it is to be understood that the invention(s) described herein is not limited in its application to the details of construction and the arrangement of components set forth in the preceding description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

What is claimed is:

1. A flexible band with in integrated knife, comprising:
   a knife comprised of a blade extending from a blade base, the blade base having a first end for interconnection to the blade and a second end opposed from the first end, the blade comprising an upper edge defining an apex and an opposed lower sharpened edge ending in a tip wherein the upper edge and the lower edge are joined, and the blade base also having a handle guard extending from a location proximate to the first end of the blade base;
   a sheath configured to receive the blade of the knife, the sheath having:
      a first end,
      a second open end, the second open end associated with a cavity also defined by a ceiling, a floor, and sidewalls of the sheath, wherein the tip is spaced from the floor when the blade is fully inserted into the sheath,
      a selectively deflectable arm that ends in a detent positioned proximate to the second open end of the sheath;
   a flexible band having a first end operatively interconnected to the first end of the sheath, and a second end operatively interconnected to the second end of the blade base;
   wherein when the blade is fully inserted into the sheath, the detent is in a first locked position where the handle guard is positioned between the second open end and the detent, and wherein the detent has a second release position where the selectively deflectable arm is flexed to move the detent so that the handle guard is able to move away from the second open end of the sheath; and
   wherein a quick release movement of the knife from the sheath is achieved by moving the detent from the first locked position to the second release position by sliding the blade base along the second open end of the sheath to move the tip of the blade in the direction of the floor of the sheath.

2. The flexible band of claim 1, wherein the flexible band is made of at least one of paracord, leather, metal, cloth, rubber, or a similar flexible material.

3. The flexible band of claim 1, wherein at least one of the blade and blade base includes a gripping surface on the top surface thereof.

4. The flexible band of claim 1, wherein the detent includes a socket for selective receipt of a bulge extending from the handle guard when the detent is in the first locked position.

5. The flexible band of claim 1, wherein an outer surface of at least one of the blade base and the second open end of the sheath comprises an arcuate profile.

6. The flexible band of claim 1, wherein sliding the blade base along the second open end of the sheath rotates the blade base about a pivot point between the apex of the blade and the ceiling of the sheath.

7. A flexible band with an integrated device, comprising:
a device comprised of a first end and a second end opposed from the first end, the device comprising an upper edge and an opposed lower edge ending in a tip, and the second end having a protrusion extending from a location adjacent the first end;
a sheath having a first end and a second open end, and a cavity configured to receive the first end of the device, wherein the tip is spaced from the floor when the device is fully inserted into the sheath, the cavity being located between the first end, the second open end, and further defined by a ceiling, a floor, and sidewalls of the sheath, the sheath including a selectively deflectable arm that ends in a retaining member positioned adjacent to the second open end of the sheath;
a flexible band having a first end operatively interconnected to the first end of the sheath, and a second end operatively interconnected to the second end of the second end of the device;
wherein when the device is fully inserted into the sheath, the retaining member is in a first locked position where the protrusion is positioned between the second open end and the retaining member, and wherein the retaining member has a second release position where the selectively deflectable arm is flexed to move the retaining member so that the protrusion is able to move away from the second open end of the sheath; and
wherein a quick release movement of the device from the sheath is achieved by moving the retaining member from the first locked position to the second release position by sliding the second end of the device along the second open end of the sheath to move the tip of the device in the direction of the floor of the sheath.

8. The flexible band of claim 7, wherein the flexible band is made of at least one of paracord, leather, metal, cloth, rubber, or similar flexible material.

9. The flexible band of claim 7, wherein the device is a knife, a can opener, a bottle opener, a flint, a solid-state memory device; a flashlight, an RFID device, a whistle, a near-field communication device, a key, a finger nail file, a tool, a compass, or a writing utensil.

10. The flexible band of claim 7, wherein the sheath includes at least one of a compass, a watch, a light, a reflector, a whistle, an RFID or similar near-field communication device, a screen, and a flint.

11. The flexible band of claim 7, wherein an outer surface of at least one of the device and the sheath comprises an arcuate profile.

12. A combination knife and sheath, comprising:
a sheath comprising:
a first surface;
a second surface spaced from the first surface;
a third surface interconnecting the first surface and the second surface;
a fourth surface interconnecting the first surface and the second surface;
wherein the first surface, the second surface, the third surface, and the fourth surface define an internal volume having an opening defined by corresponding edges of the first surface, the second surface, the third surface, and the fourth surface;
wherein at least one of the third surface and the fourth surface define a transverse axis of the sheath that is generally parallel with at least a portion of at least one of the first surface and the second surface;
wherein at least one of the first surface and the second surface are curved about an axis that is substantially parallel to the transverse axis of the sheath;
an arm deflectably attached to the fourth surface; and
a detent interconnected to an end of the arm;
a knife with a first portion adapted to be selectively inserted within the volume and a second portion that is positioned outside the volume when the first portion is positioned in the volume, the first portion comprising an upper edge defining an apex and an opposed lower sharpened edge ending in a tip, and the second portion having a handle guard extending from a location proximate to the first portion;
wherein when the first portion of the knife is fully inserted into the sheath, the detent is in a first locked position with the handle guard is positioned between the opening and the detent, and wherein the detent has a second release position where the arm is flexed to move the detent so that the handle guard is able to move away from the opening of the sheath; and
wherein a quick release movement of the knife from the sheath is achieved by moving the detent from the first locked position to the second release position by sliding the second portion of the knife along the opening of the sheath to move the tip of the first portion of the knife toward the fourth surface of the sheath.

13. The sheath of claim 12, wherein the handle guard comprises a bulge that is selectively received within a socket provided in the detent.

14. The sheath of claim 12, wherein the third surface is textured.

15. A combination knife and sheath, comprising:
a knife comprised of a blade extending from a blade base, the blade base having a first end for interconnection to the blade and a second end opposed from the first end, the blade comprising an upper edge defining an apex and an opposed lower sharpened edge ending in a tip wherein the upper edge and the lower edge are joined, and the blade base also having a handle guard extending from a location proximate to the first end of the blade base;
a sheath configured to receive the blade of the knife, the sheath having:
a first end,
a second open end, the second open end associated with a cavity also defined by a ceiling, a floor, and sidewalls of the sheath, wherein the tip is spaced from the floor when the blade is fully inserted into the sheath,
a selectively deflectable arm that ends in a detent positioned proximate to the second open end of the sheath;
wherein when the blade is fully inserted into the sheath, the detent is in a first locked position where the handle guard is positioned between the second open end and the detent, and wherein the detent has a second release position where the selectively deflectable arm is flexed to move the detent so that the handle guard is able to move away from the second open end of the sheath; and
wherein a quick release movement of the knife from the sheath is achieved by moving the detent from the first locked position to the second release position by sliding the blade base along the second open end of the sheath to move the tip of the blade toward the floor of the sheath.

* * * * *

UNITED STATES PATENT AND TRADEMARK OFFICE
CERTIFICATE OF CORRECTION

PATENT NO. : 9,999,279 B2
APPLICATION NO. : 15/605410
DATED : June 19, 2018
INVENTOR(S) : Bloch It is certified that error appears in the above-identified patent and that said Letters Patent is hereby corrected as shown below:

In the Claims

Claim 1, Line 1 - "in" should be -- an --.

Claim 1, Line 15 - "a cavity also defined" should be -- a cavity defined --.

Claim 2, Line 1 - "The flexible band of claim 1" should be -- The flexible band with an integrated knife of claim 1 --.

Claim 3, Line 1 - "The flexible band of claim 1" should be -- The flexible band with an integrated knife of claim 1 --.

Claim 4, Line 1 - "The flexible band of claim 1" should be -- The flexible band with an integrated knife of claim 1 --.

Claim 5, Line 1 - "The flexible band of claim 1" should be -- The flexible band with an integrated knife of claim 1 --.

Claim 6, Line 1 - "The flexible band of claim 1" should be -- The flexible band with an integrated knife of claim 1 --.

Claim 8, Line 1 - "The flexible band of claim 7" should be -- The flexible band with an integrated device of claim 7 --.

Claim 9, Line 1 - "The flexible band of claim 7" should be -- The flexible band with an integrated device of claim 7 --.

Claim 10, Line 1 - "The flexible band of claim 7" should be -- The flexible band with an integrated device of claim 7 --.

Signed and Sealed this
Thirty-first Day of July, 2018

Andrei Iancu
*Director of the United States Patent and Trademark Office*

CERTIFICATE OF CORRECTION (continued)
U.S. Pat. No. 9,999,279 B2

Claim 11, Line 1 - "The flexible band of claim 7" should be -- The flexible band with an integrated device of claim 7 --.

Claim 13, Line 1 - "The sheath of claim 12" should be -- The combination of claim 12 --.

Claim 14, Line 1 - "The sheath of claim 12" should be -- The combination of claim 12 --.

Claim 15, Line 15 - "a cavity also defined" should be -- a cavity defined --.